United States Patent [19]
Weltin et al.

[11] Patent Number: 5,318,283
[45] Date of Patent: Jun. 7, 1994

[54] RUBBER BEARING

[75] Inventors: Uwe Weltin, Rimbach; Ulrich Freudenberg, Hirschberg; Tillman Freudenberg, Fürth/Steinbach, all of Fed. Rep. of Germany

[73] Assignee: Firma Carl Freudenberg, Weinheim, Fed. Rep. of Germany

[21] Appl. No.: 976,080

[22] Filed: Nov. 13, 1992

[30] Foreign Application Priority Data

Nov. 15, 1991 [DE] Fed. Rep. of Germany ....... 4137602

[51] Int. Cl.$^5$ ................. F16F 13/00; B60K 5/12
[52] U.S. Cl. ................. 267/140.14; 248/562
[58] Field of Search .......... 267/140.14, 140.15, 267/219, 35; 248/550, 562, 636

[56] References Cited

U.S. PATENT DOCUMENTS

| 4,650,170 | 3/1987 | Fukushima | 267/140.12 |
| 4,693,455 | 9/1987 | Andra. | |
| 4,762,306 | 8/1988 | Watanabe et al. | |
| 4,793,599 | 12/1988 | Ishioka et al. | 267/140.14 |
| 4,872,652 | 10/1989 | Rohner et al. | 267/140.14 |
| 4,899,996 | 2/1990 | Maassen et al. | 267/219 |
| 5,042,786 | 8/1991 | Freudenberg et al. | |
| 5,238,232 | 8/1993 | Kobayashi et al. | |

FOREIGN PATENT DOCUMENTS

| 0440536 | 8/1991 | European Pat. Off. | |
| 3423698 | 1/1985 | Fed. Rep. of Germany. | |
| 65928 | 4/1985 | Japan | 267/140.14 |
| 234143 | 11/1985 | Japan | 267/140.14 |

Primary Examiner—Matthew C. Graham
Attorney, Agent, or Firm—Kenyon & Kenyon

[57] ABSTRACT

A rubber bearing, in which a liquid-filled working chamber is bounded by an expanding member and by a compensating wall that is capable of moving back and forth in the direction of the working chamber, wherein the compensating wall consists at least partially of a material that is capable of being moved by magnetic forces and extends relatively movably with one partial area into an air gap between mutually opposing electromagnets, which are capable of receiving an electric current. Each electromagnet has at least one coil capable of receiving a d.c. current and at least one coil capable of receiving an a.c. current. In the opposing electromagnets, current traverses either the direct current coils or the alternating coils in opposite directions.

19 Claims, 4 Drawing Sheets

RUBBER BEARING

BACKGROUND OF THE INVENTION

The invention relates to rubber bearings, and, more particularly, to a rubber bearing in which a liquid-filled working chamber is bounded at least by a resilient expanding member and by a compensating wall that is capable of moving back and forth in the direction of the working chamber. The compensating wall consists at least partially of a material that is capable of being moved by magnetic forces. One partial area of the compensating wall extends into an air gap between mutually opposing magnetic coils, which are rigidly supported in coil braces and are capable of receiving electric currents.

The German Published Patent Application DE-OS 34 23 698 discloses a rubber bearing using a fluid chamber. This rubber bearing is also described in U.S. Pat. No. 4,650,170 to Fukushima, the disclosure of which is hereby incorporated by reference into the present specification. Pulsating pressure fluctuations are generated in the fluid contained in the fluid chamber of that bearing by a vibrational element activated by magnetic coils. If movement of the vibrational element is modulated in relation to vibrations introduced from the outside, then transmission of vibrations is reduced.

In the bearing described in DE-OS 34 23 698 and U.S. Pat. No. 4,650,170, the magnetic coils must be alternately triggered to isolate vibrations, since the coils can generate only attractive forces. Further, the attractive forces on the vibrational element are proportional to the square of the coil current, requiring special equalization measures to achieve a sinusoidal response. Moreover, because the forces vary significantly with the gap width, the system reacts quite sensitively to mechanical tolerance errors. Additionally, no precautions have been taken to retain the compensating wall in a neutral position symmetrically between the magnetic coils.

SUMMARY OF THE INVENTION

An object of the present invention is to achieve improved vibration isolation of acoustically disturbing vibrations by providing a rubber bearing having a comparatively simple design which can be operated by a simple triggering of magnetic coils.

Another object of the present invention is to provide a rubber bearing with improved linearity properties, so that the response to a sinusoidal current signal will likewise be a sinusoidal, only slightly distorted force signal.

Another object of the present invention is to provide a rubber bearing in which mechanical tolerances bear considerably less influence on the working properties of the bearing.

Another object of the present invention is to provide a rubber bearing which can be manufactured economically.

The invention achieves these objectives by providing a rubber bearing in which a liquid-filled working chamber is bounded by an expanding member and by a compensating wall that is capable of moving back and forth in the direction of the working chamber, wherein the compensating wall consists at least partially of a material that is capable of being moved by magnetic forces and extends relatively movably with one partial area into an air gap between mutually opposing magnetic coils, which are rigidly supported in two coil braces and are capable of receiving electric current.

Each coil brace has a direct current magnetic coil and an alternating current magnetic coil. The arrangement may be such that a) current traverses the opposing direct current magnetic coils in the same direction with respect to each other and the opposing alternating current magnetic coils in opposite directions with respect to each other, or b) current traverses the opposing alternating current magnetic coils in the same direction with respect to each other and the opposing direct current magnetic coils in opposite directions with respect to each other.

DETAILED DESCRIPTION

Figure 1:
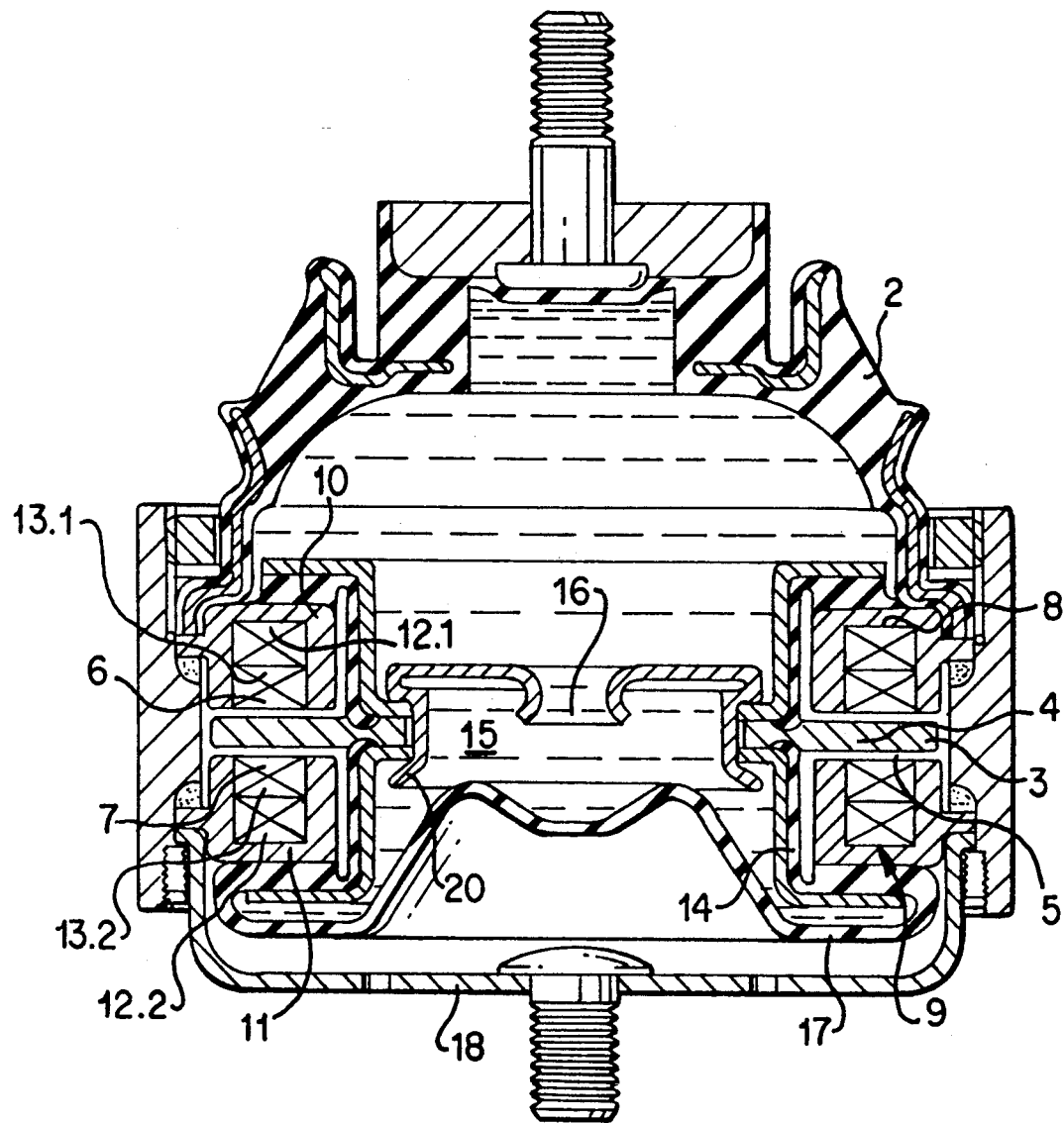
FIG. 1 shows an embodiment of a rubber bearing constructed in accordance with the present invention in longitudinal cross section.

FIG. 1 depicts a rubber bearing constructed according to the invention containing a liquid-filled working chamber 1, which is bounded in the axial direction on one side by a rubber elastic expanding member 2 and, on the other side, by a compensating wall 3 that is capable of moving back and forth in the axial direction. As depicted here, the compensating wall 3 can have a central perforation, in which another structural member 20, which constitutes a continuation of the compensating wall 3, is configured with a connecting orifice 16. The structural member 20 of the compensating wall 3 may be made of a polymer material. A compensating wall made at least partially of plastic has a particularly low inertial mass, which plays an important role in the isolation of high-frequency vibrations.

The connecting orifice 16 allows fluid communication between the working chamber 1 and a compensating chamber 15. The compensating chamber 15 is configured on the side of the compensating wall 3 facing away from the working chamber 1 and receives the liquid volume that is displaced out of the working chamber 1 through the connecting orifice 16. The connecting orifice 16 is adapted as a damping orifice to the conditions of a particular application to damp low-frequency, large-amplitude vibrations. Duct-type connecting orifices can also be provided in place of the circular connecting orifice 16 shown here.

The compensating wall 3 is preferably retained in a neutral position by means of an elastic system 14 at a middle position in an air gap 5. The elastic system 14 also seals off the fluid in the working chamber 1 and the compensating chamber 15. In this exemplified embodiment, the elastic system 14 is comprised of an elastomeric material that is formed in one piece with a rubber elastic compensating membrane 17.

To protect the compensating membrane 17, which has a rolling-diaphragm-type design, and to secure the rubber bearing according to the invention to an adjoining structural member, a cover plate 18 containing vent holes is provided in the axial direction on the side of the compensating membrane 17 away from the compensating chamber 15.

In one partial area 4, the compensating wall 3 consists of a material that is capable of being moved by magnetic forces. The partial area 4 is arranged so that it is axially movable in the air gap 5 between two electromagnets 6, 7 that oppose one another axially. Each electromagnet 6, 7 is comprised of a d.c. current coil 12.1, 12.2 and an a.c. current coil 13.1, 13.2. The coils 12.1, 12.2, 13.1, 13.2 are rigidly supported in each case in a slot 8, 9 of a magnetic coil brace 10, 11. The partial area 4, the electromagnets 6, 7, and the air gap 5 are sealed off from the liquid contained inside the bearing by the elastic system 14.

Figure 2:
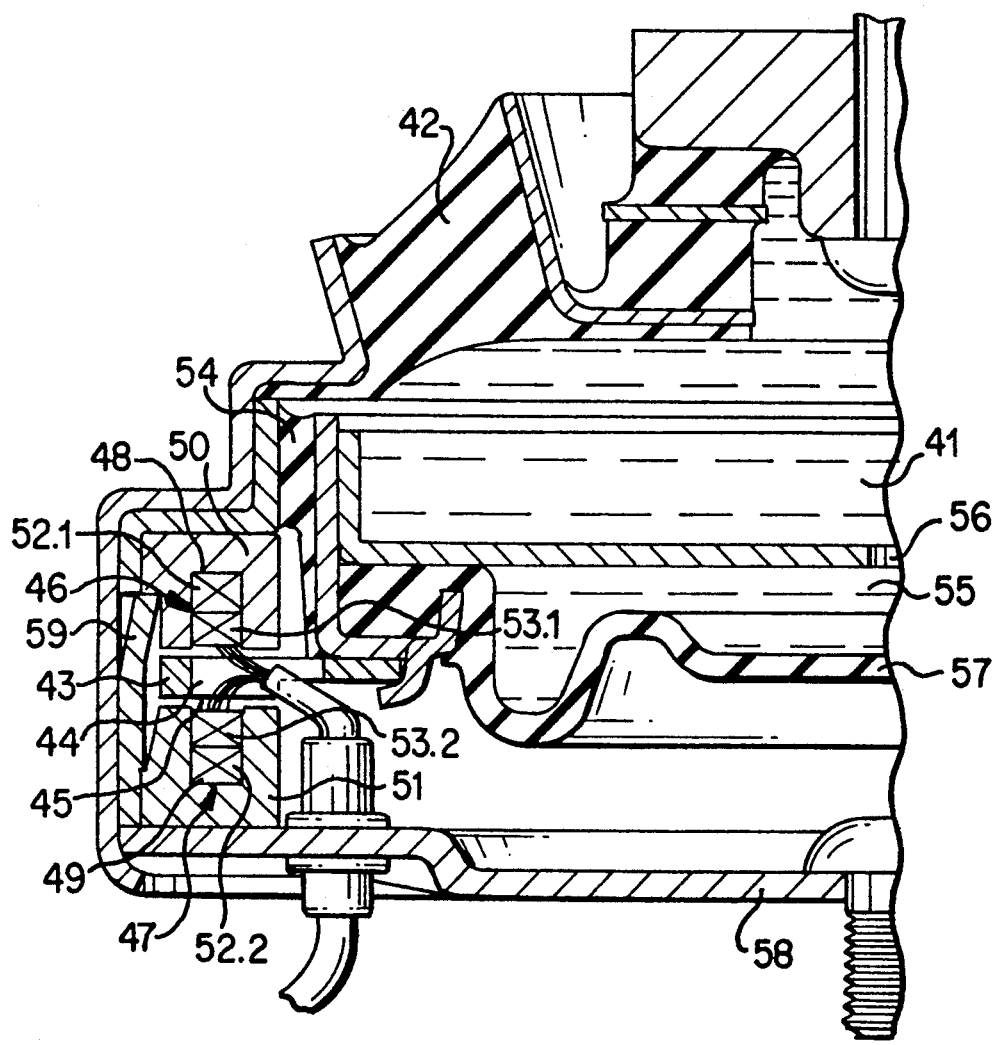
FIG. 2 shows another embodiment of a rubber bearing constructed in accordance with the present invention, showing one half of a longitudinal cross section.

FIG. 2 shows another embodiment of a rubber bearing according to the invention which is similar to the one in FIG. 1. A working chamber 41 is bounded by a rubber elastic expanding member 42 and by a compensating wall 43 having a connecting orifice 56 for fluid communication with a compensating chamber 55 bounded by a compensating membrane 57. The compensating wall 43 is retained by an elastic system 54 in an air gap 45. A cover plate 58 is provided on one side of the compensating membrane 57.

In one partial area 44, the compensating wall 43 consists of a material that is capable of being moved by magnetic forces. The partial area 44 is arranged so that it is axially movable in the air gap 45 between two electromagnets 46, 47 that oppose one another axially. Each electromagnet 46, 47 is comprised of a d.c. current coil 52.1, 52.2 and an a.c. current coil 53.1, 53.2. The coils 52.1, 52.2, 53.1, 53.2 are rigidly supported in each case in a slot 48, 49 of a magnetic coil brace 50, 51.

In the FIG. 2 embodiment, electrical connections for actuating the electromagnets 46, 47 are not led radially from the outside to the coils as in FIG. 1, but rather in the axial direction from below through the cover plate 58. As depicted here, the compensating wall 43 has at least one window for cable penetration, so that the coils can receive a.c. current and d.c. current. Another feature of this embodiment is that it has several lugs 59 arranged along the periphery, which fix the electromagnet 56 in position. The function of the rubber bearing of FIG. 2 substantially corresponds to the function of the bearing of FIG. 1, which is described below.

The rubber bearing according to the invention can be arranged between the body and the internal combustion engine and/or the chassis of an automobile to isolate high frequency vibrations.

Figure 3:
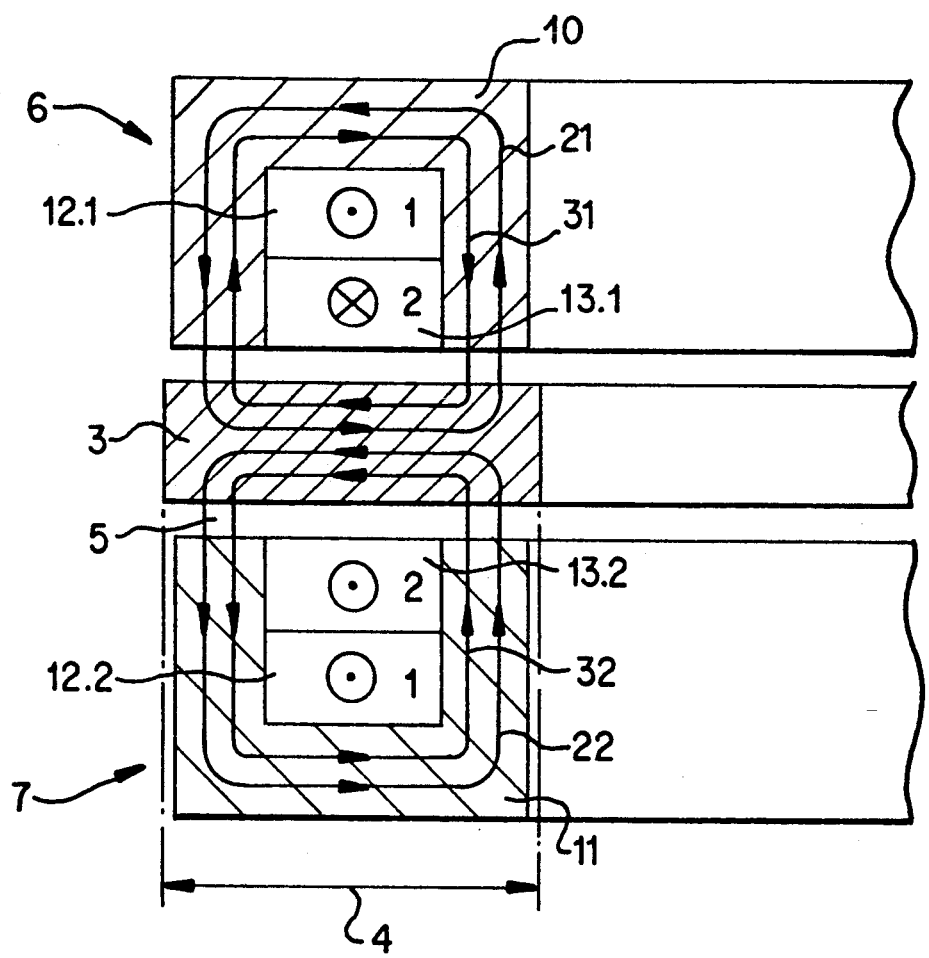
FIG. 3 shows an enlarged view of the magnetic vibrational structure of FIG. 1.

The functioning of a rubber bearing constructed according to the invention may be more fully understood with reference to FIG. 3, which shows an enlarged view of the magnetic vibrational structure of FIG. 1. Electromagnets 6, 7 are arranged on mutually opposing sides of the compensating wall 3, and the compensating wall 3 is situated in a central position in the air gap 5, so that the widths of the gap on both sides of the compensating wall 3 are essentially the same.

The current-carrying directions of the coils 12.1, 12.2, 13.1, 13.2 are schematically depicted in FIG. 3 by symbols within the windings. A dot inside a circle signifies that the current flows through the winding out of the drawing plane towards the viewer, while a cross inside a circle signifies an opposite current-carrying direction, thus away from the viewer, into the drawing plane.

As can be seen in FIG. 3, in this embodiment direct current traverses the d.c. current coils 12.1, 12.2 in the same sense of direction. The d.c. current coils therefore generate magnetic fluxes 21, 22 in the directions indicated in FIG. 3. In this exemplified embodiment, the d.c. current coils 12.1, 12.2 have the same dimensions and the same number of turns and are connected in series to one another. Thus, the current in each coil is the same, producing equal magnetic fluxes to achieve the desired symmetry of force. The d.c. voltage source for the direct current coils may be, for example, an automobile battery.

Alternating current traverses the a.c. current coils 13.1, 13.2 in opposite directions around their respective slots. The alternating magnetic fluxes produced by the a.c. current coils 13.1, 13.2 are denoted by the reference symbols 31, 32. Like the direct current coils, the alternating current coils have symmetry of construction with respect to each other, and they are connected in series to produce equal fluxes. However, these fluxes are oriented in opposite directions.

As shown in FIG. 3, the alternating current magnetic fluxes 31, 32 are superimposed upon the direct current fluxes 21, 22. Therefore, a strengthening of the magnetic flux results on the lower side of the compensating wall 3, and a weakening of the magnetic flux results on the upper side of the compensating wall 3.

In operation, by supplying current to the direct current coils, the magnetic circuits are preloaded to a working point of magnetic flux wherein the axial attractive forces cancel each other out toward both sides. This symmetry of force is disturbed by a current that traverses the alternating current coils. When an a.c. voltage is supplied to the alternating current coils, the magnetic flux is strengthened on one side and simultaneously weakened on the other, as described above. The force on the compensating wall is modulated by the frequency of the a.c. voltage, so that a back-and-forth moving alternating force is exerted on the compensating wall. The direction of the vibrations to be isolated substantially corresponds to the moving direction of the compensating wall when the alternating force caused by alternating current is applied.

This described configuration achieves particularly good linearity between the current in the magnetic coils and the force on the compensating wall, thus eliminating the need for signal shaping measures. Linearity is achieved because, when the compensating wall is symmetrically between the electromagnets, the non-linear force components on each side of the compensating wall cancel each other. To illustrate this principle, it is helpful to describe the action of force on the compensating wall in simplified mathematical terms. For this purpose, it is assumed that the compensating wall is fixed in its middle position and that the magnetic fields in the air gaps are homogeneous. The net force F on the compensating wall results as the difference between two attractive forces $F_1$ and $F_2$. These attractive forces are proportional to the square of the particular total flux on each side, which, in turn, is composed of the direct current and the alternating current components:

$$F_1 = \tfrac{1}{4} K^* (N_1 {}^* I_1 + N_2 {}^* I_2)^2$$

$$F_2 = \tfrac{1}{4} K^* (N_1 {}^* I_1 - N_2 {}^* I_2)^2$$

Here, $N_1$ and $I_1$ signify the number of turns and current of the two direct current coils, and $N_2$ and $I_2$ signify the number of turns and current of the two alternating current coils. The geometric factor k is dependent on the axial gap width, the form and spacing of the magnetic coils, and the gap face. These factors are the same on both sides of the compensating wall.

The net force F is the difference between the attractive forces $F_1$ and $F_2$ acting on the opposite sides of the compensating wall:

$$F = F_1 - F_2$$

Therefore, the resulting force on the compensating wall is given by the formula:

$$F = k * N_1 * N_2 * I_1 * I_2.$$

As revealed by the formula, for a given direct current, the force acting on the compensating wall is directly proportional to the alternating flux and thus directly proportional to the current in the alternating current coils. An alternating force directly proportional to the current in the a.c. current coils can therefore be achieved. It should be noted also that the magnitude of the alternating force also can be controlled by the d.c. current.

It will be appreciated that when the compensating wall is deflected out of its central position, the non-linear force components no longer fully cancel. However the linearity requirements can be achieved in a sufficiently large amplitude range by appropriately selecting the geometric relationships of the components. The non-linear force components remain negligibly small as long as the deflection out of the central position remains small compared to the gap width. The linearity of the system can be improved if the a.c. current ampere-turns $N_2 \times I_2$ remain clearly under the value of the d.c. current ampere-turns $N_1 \times I_1$.

The alternating current windings can be designed to have a smaller number of turns than the direct current windings. With this refinement, a lower inductance is achieved, whereby a rubber bearing developed in this manner shows a particularly low electric inertia. A low electric inertia is desired when, at a given maximum frequency, a defined force is supposed to be reached with as little electric voltage as possible. A smaller number of turns creates a lower resistance. A small number of turns also requires lower voltage. Thus, the arrangement can be adapted to a battery of a car.

Since no such demands are made of dynamic performance in the case of the direct current winding, one can adjust the desired static force as well as adapt the suitable ohmic resistance, for example by means of a multitude of windings with thin wires, to allow the direct current coil to be linked directly to a d.c. voltage source.

The advantageous functioning of the rubber bearing results from the fact that the currents from the direct current coil and the alternating current coil flow in the same direction in one of the electromagnets, so that the magnetic fluxes reinforce each other, and in opposite directions in the other magnet, so that the magnetic fluxes weaken each other. This can be achieved when, as depicted in FIG. 3, the direct current coils carry current in the same direction in both electromagnets while the alternating current coils carry current in opposite directions. An alternative construction is possible in which the alternating current coils carry current in the same direction while the direct current coils carry current in opposite directions.

Depending upon which embodiment is to be used, either one of the direct-current coils or one of the alternating-current coils can be provided with interchanged connecting terminals to achieve the reverse current flow. If the terminals are interchanged, the d.c. current windings and a.c. current windings may be wound in the same sense of direction, thus allowing the rubber bearing to be manufactured quite simply and economically.

For further economic efficiency, both electromagnets may have the same constructional design, including similarity of coil braces. This also helps achieve a symmetry of force, which facilitates the designing of the system and leads to the greatest possible linearity response.

Given the same sense of direction and interchanged connecting terminals, it may be useful from a production engineering standpoint for the direct-current coils and the alternating-current coils to be wound from bifilar, double-wound wires. Restricting the number of preformed coils to two facilitates the assembly of the rubber bearing according to the invention.

In an alternative embodiment, the d.c. current windings and the a.c. current windings may be wound separately, and, to achieve a reverse current flow, either the two direct-current coils or the two alternating-current coils can be wound in opposite directions. In an arrangement of this type, the coils are designed as four separate preformed coils. The advantage is that one is free to choose the number of turns for a particular application.

In a construction such as that shown in FIG. 1, the rigidity of the elastic system 14 is set high enough that, together with the inertia of the compensating wall 3 and the adjoining fluid, a system results with a resonant frequency above the frequency range in normal operation. As a result of this sub-critical tuning, the phase shifts between the deflection of the compensating wall and an a.c. current, which influence the compensating wall in its vibration response, are kept to a minimum. This refinement considerably simplifies the control of the magnetic coils from a standpoint of control engineering.

Figure 4:
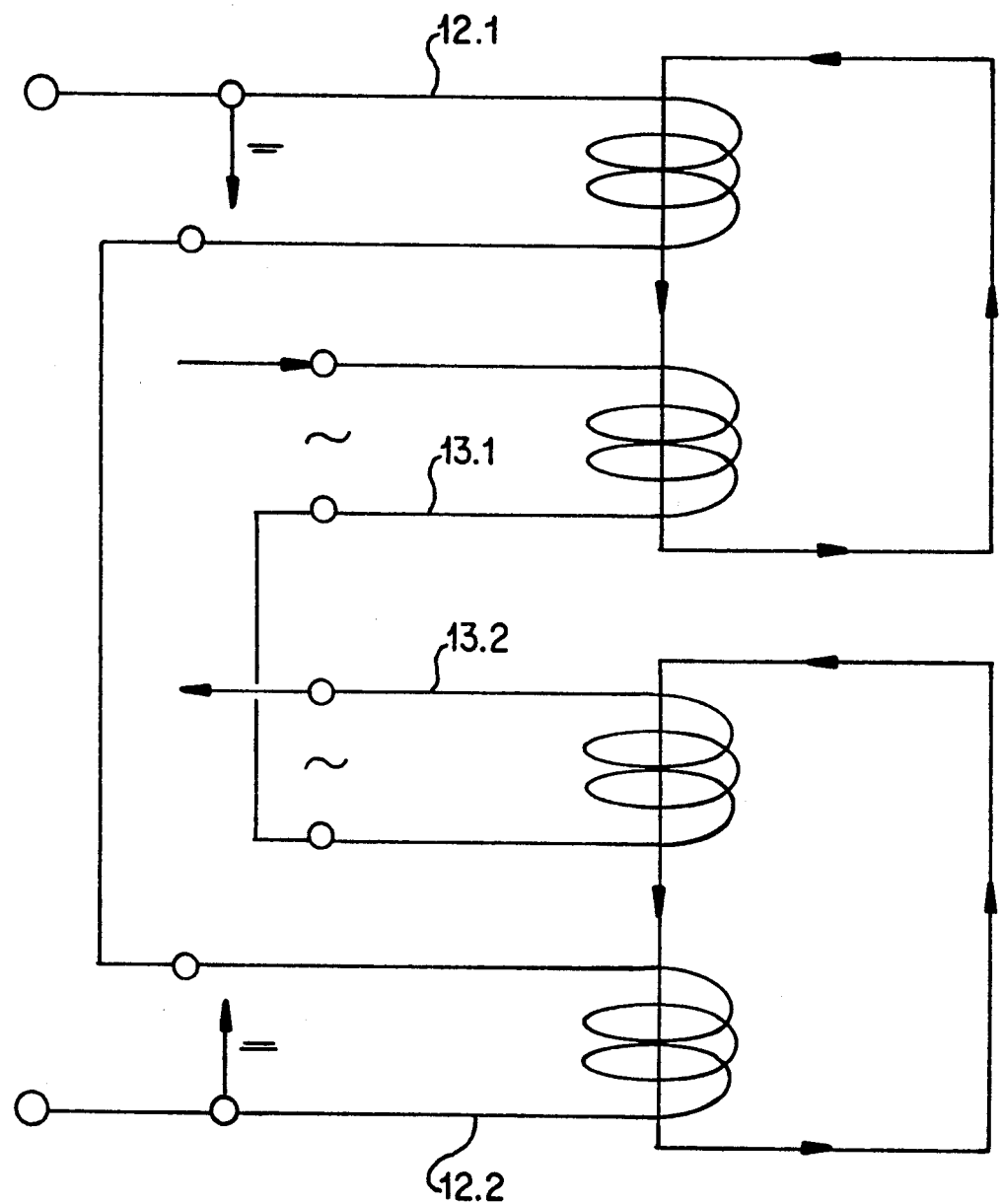
FIG. 4 shows schematically the manner of electrically connecting components of the rubber bearing of FIG. 1.

FIG. 4 shows a schematic sketch in which the two d.c. current 12.1, 12.2 and the two a.c. current coils 13.1, 13.2 are combined in each case in an electric series connection. The a.c. current coils 13.1, 13.2 carry current in opposite directions according to FIGS. 1 through 3. According to a preferred embodiment, the a.c. current coils 13.1, 13.2 are wound in the same direction and are provided with interchanged connecting terminals. These interchanged terminals cause current flow in opposite directions in the same way as if the a.c. current coils were wound in opposite directions. While the two direct-current coils and the two alternating-current coils can be effectively combined, in each case, into one electric series connection as shown in FIG. 4, each coil can also be supplied separately.

What is claimed is:

1. A rubber bearing comprising:
    a liquid-filled working chamber;
    an expanding member bounding one side of said working chamber;
    a compensating wall bounding another side of said working chamber, capable of moving back and forth in the direction of said working chamber, and comprised at least partially of a material capable of being moved by magnetic forces;

a first electromagnet comprising a first direct current magnetic coil and a first alternating current magnetic coil; and a second electromagnet comprising a second direct current magnetic coil and a second alternating current magnetic coil;

wherein said first electromagnet and said second electromagnet are positioned on opposite sides of said compensating wall and oppose one another axially; and wherein current traverses said first direct current magnetic coil and said second direct current magnetic coil in the same direction with respect to each other, and current traversers said first alternating current magnetic coil and said second alternating current magnetic coil in opposite directions with respect to each other.

2. The rubber bearing according to claim 1, wherein said first direct current magnetic coil and said second direct current magnetic coil are combined in an electric series connection, and said first alternating current magnetic coil and said second alternating current magnetic coil are combined in an electric series connection.

3. The rubber bearing according to claim 1, wherein said first direct current magnetic coil, said first alternating current magnetic coil, said second direct current magnetic coil, and said second alternating current magnetic coil are each wound separately.

4. The rubber bearing according to claim 1, wherein said first alternating current magnetic coil and said second alternating current magnetic coil are wound in opposite directions.

5. The rubber bearing according to claim 1, wherein said first alternating current magnetic coil and said second alternating magnetic coil each has a smaller number of turns than said first direct current magnetic coil and said second direct current magnetic coil.

6. The rubber bearing according to claim 1, wherein connecting terminals of said first alternating current magnetic coil are interchanged with respect to connecting terminals of said second alternating current magnetic coil.

7. The rubber bearing according to claim 6, wherein said first direct current magnetic coil and said first alternating current magnetic coil are combined in a bifilar winding, and said second direct current magnetic coil and said second alternating current magnetic coil are combined in a bifilar winding.

8. The rubber bearing according to claim 1, wherein said first direct current magnetic coil and said first alternating current magnetic coil are combined in a first coil brace forming a first structural element, and said second direct current magnetic coil and said second alternating current magnetic coil are combined in a second coil brace forming a second structural element, wherein said first structural element has a same design as said second structural element.

9. The rubber bearing according to claim 1, wherein said first direct current magnetic coil and said second direct current magnetic coil are linked directly to a direct current source.

10. The rubber bearing according to claim 1, wherein said compensating wall is supported by an elastic system, and said compensating wall has an inertial mass, which, together with the rigidity of said elastic system, forms a system having a resonant frequency that lies above the frequency of vibrations to be isolated.

11. A rubber bearing comprising:
a liquid-filled working chamber;
an expanding member bounding one side of said working chamber;

a compensating wall bounding another side of said working chamber, capable of moving back and forth in the direction of said working chamber, and comprised at least partially of a material capable of being moved by magnetic forces;

a first electromagnet comprising a first direct current magnetic coil and a first alternating current magnetic coil; and a second electromagnet comprising a second direct current magnetic coil and a second alternating current magnetic coil;

wherein said first electromagnet and said second electromagnet are positioned on opposite sides of said compensating wall and oppose one another axially; and wherein current traverses said first direct current magnetic coil and said second direct current magnetic coil in opposite directions with respect to each other, and current traversers said first alternating current magnetic coil and said second alternating current magnetic coil in the same direction with respect to each other.

12. The rubber bearing according to claim 11, wherein said first direct current magnetic coil and said second direct current magnetic coil are combined in an electric series connection, and said first alternating current magnetic coil and said second alternating current magnetic coil are combined in an electric series connection.

13. The rubber bearing according to claim 11, wherein said first direct current magnetic coil and said second direct current magnetic coil are wound in opposite directions.

14. The rubber bearing according to claim 11, wherein connecting terminals of said first direct current magnetic coil are interchanged with respect to connecting terminals of said second direct current magnetic coil.

15. The rubber bearing according to claim 14, wherein said first direct current magnetic coil and said first alternating current magnetic coil are combined in a bifilar winding, and said second direct current magnetic coil and said second alternating current magnetic coil are combined in a bifilar winding.

16. The rubber bearing according to claim 11, wherein said first direct current magnetic coil, said first alternating current magnetic coil, said second direct current magnetic coil, and said second alternating current magnetic coil are each wound separately.

17. The rubber bearing according to claim 11, wherein said first direct current magnetic coil, said first alternating current magnetic coil are combined in a first coil brace forming a first structural element, and said second direct current magnetic coil and said second alternating current magnetic coil are combined in a second coil brace forming a second structural element, wherein said first structural element has a same design as said second structural element.

18. The rubber bearing according to claim 11, wherein said first direct current magnetic coil, and said second direct current magnetic coil are linked directly to a direct current source.

19. The rubber bearing according to claim 11, wherein said compensating wall is supported by an elastic system, and said compensating wall has an inertial mass, which, together with the rigidity of said elastic system, forms a system having a resonant frequency that lies above the frequency of vibrations to be isolated.

* * * * *